United States Patent [19]

Kerr et al.

[11] Patent Number: 4,460,807

[45] Date of Patent: Jul. 17, 1984

[54] CONFERENCE ROUTING ARRANGEMENT

[75] Inventors: Howard A. Kerr, West Chicago; David F. Winchell, Glen Ellyn, both of Ill.

[73] Assignee: AT&T Bell Laboratories, Murray Hill, N.J.

[21] Appl. No.: 450,254

[22] Filed: Dec. 16, 1982

[51] Int. Cl.³ .............................................. H04M 3/56
[52] U.S. Cl. ................................................ 179/18 BC
[58] Field of Search ............. 179/8 R, 18 AB, 18 BC, 179/18 BA, 18 BS, 27 D; 364/900; 370/62

[56] References Cited

U.S. PATENT DOCUMENTS

2,275,459 3/1942 Nyquist .................................. 179/27

Primary Examiner—Stafford D. Schreyer
Attorney, Agent, or Firm—C. H. Davis

[57] ABSTRACT

A processor controlled conference arrangement is connected to a host switching system. The availability of conference resources (e.g., ports, registers, etc.) and processor real time capacity is measured before a call is forwarded to the conference arrangement.

7 Claims, 6 Drawing Figures

FIG. 1

FIG. 2
MAIN PROCESSOR SYSTEM

FIG. 5

CONFERENCE ROUTING ARRANGEMENT

TECHNICAL FIELD

This invention relates to communication systems and particularly, to method and apparatus for routing calls in a communication system.

In a more particular aspect, this invention relates to routing calls to special service facilities such as conferencing arrangements.

In a still more particular aspect, this invention relates to a method and apparatus for ascertaining the availability of conference facilities prior to engaging the facilities for a conference call.

BACKGROUND OF THE INVENTION

In a communication network, it is desirable to provide a conferencing service whereby a plurality of widely separated customers can converse using their telephone stations, or the customers can exchange data using their data terminals.

It is also desirable that this service be automated to the extent that customers can access and control the service with minimum assistance from an operator.

Thus, automatic dial-up conference arrangements are known whereby a customer can dial a conference access number and be connected to a multiport conference bridge. These bridges are generally fixed in size (usually six ports or channels) and to create a larger conference, the originator utilizes a port on the first bridge dialed to access a second bridge. When two six-port bridges are combined using the ports to interconnect the bridges, only ten ports are available for the conferees.

The above arrangement is advantageous in that once the originator has accessed a bridge, the originator is guaranteed the number of ports assigned to the bridge. Assigning a fixed number of ports to a bridge, however, has certain disadvantages. For example, when a six port bridge is used for a three party conference, the remaining idle ports on the bridge are unavailable for other conferences.

Thus, instead of fixedly assigning ports to a conference bridge, some conference arrangement select ports for each conference from a common pool of resources so that conferences of varying sizes can be established leaving the idle ports available for other conferences. While these later arrangements are suitable for their intended purpose they have certain disadvantages in that the conference originator is not guaranteed that the desired resources such as the number of ports, are available when the facility is accessed.

SUMMARY OF THE INVENTION

The foregoing problem is solved, and a technical advance is achieved by an arrangement which interrogates the facility for the availability of resources before committing the conference call to the facility.

More specifically, the invention in this illustrative disclosure is embodied in a stand-alone conference arrangement which is accessed via a host telephone switching system.

Upon dialing a conference access code, the customer is routed to the host switching system, and a message is sent to the conference arrangement to inquire if sufficient facilities are available. The conference arrangement evaluates various resources such as the number of ports, memory, real-time capability, etc., before accepting the call. If sufficient resources are not available, the conference arrangement informs the switching system, and the host office attempts to route the call to another facility or to another host office with similar conference arrangements.

GENERAL SYSTEM DESCRIPTION

Figure 1:
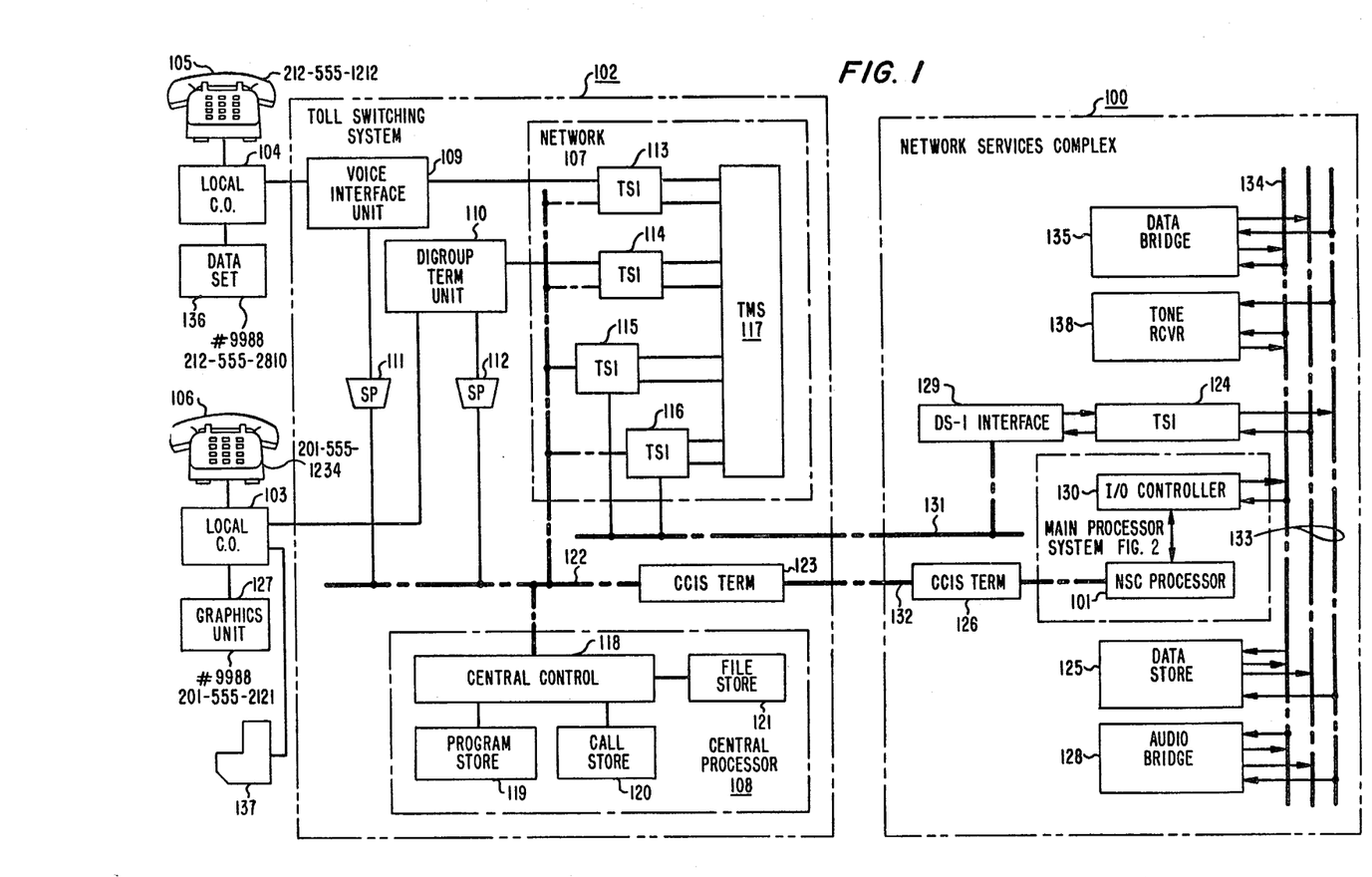
FIG. 1 shows a block diagram of a telephone network having a toll switching system equipped with a network services complex for providing conference services.

The general organization of a system employing the invention is illustrated in the block diagram of FIG. 1 which shows a typical communications network having a toll switching system 102 which serves local telephone central offices 103 and 104. Central offices 104 and 103 contain the switching apparatus for providing telephone service to customer stations 105 and 106, respectively and data service to data set 136 and graphics unit 127. Also connected to central office 103 is teleconference operator position 137. Connected to switching system 102 is a network services complex 100 for providing special services such as audio/data conferencing.

Network services complex 100 includes NSC processor 101, data store system 125, input/output controller 130, audio bridge system 128, data bridge system 135, a plurality of tone receivers such as 138, and other units. As will be described in more detail below, one of the functions of complex 100 is to provide audio/data conferencing with announcements and instructions to customers over the telephone network via the toll and local switching offices.

Toll switching system 102, as depicted in FIG. 1, is a typical electronic switching system, such as, the No. 4 ESS which is manufactured by the Western Electric Company, Incorporated. This switching system is described in detail in the *Bell System Technical Journal*, Vol. 56, No. 7, Sept. 1977, and need not be fully described herein for the reader to understand the present invention.

Switching system 102 comprises a network 107, a central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113-116 and time multiplex switch (TMS) unit 117.

Access to the switching network 107 is via serial pulse code modulation links each accommodating 120 voice channels. However, central offices 103 and 104 can be connected to toll switching system 102 via analog or digital transmission facilities. Thus, as seen in FIG. 1, local central office 103 is connected to the toll office over the digital facilities which terminate in digroup terminal unit 110, while local office 104 is connected via analog trunks to voice interface unit 109. Digroup terminal 110 performs the multiplexing and demultiplexing between the interoffice transmission facilities and network 107 and also processes signaling information via signal processor 112.

The analog trunks are terminated in a voice interface unit such as 109 whose principal function is analog-to-digital conversion (and vice-versa) plus formatting digital data for the TSI units. Voice interface unit 109 communicates with the central control via signal processor 111.

Signal processor 111 provides the scan, distribute and digit reception tasks for analog trunks, signal processor 112 performs the equivalent tasks for the digital trunks except that instead of physical scan and distribution points, the supervisory states of each trunk are stored in a memory in a signal processor.

The majority of the logic, control, storage and translation functions required for the operation of the toll switching system are performed by central processor 108. A typical processor suitable for use in the illustrative toll switching system is described in the *Bell System Technical Journal,* Vol. 56, No. 2, Feb. 1977.

Central control 118 is the information processing unit of the system and executes the program instructions resident in program store 119 using the call processing data in call store 120. Central control 118 communicates with the peripheral units via bus 122.

As mentioned above, interoffice signaling information is extracted from the transmission paths of analog and digital trunks by signal processors 111 and 112, respectively, and used by central control 118 for call processing. However, the signaling for certain trunks may be transmitted between the offices over a common data link separate from the transmission paths using a common channel interoffice signaling system. A typical common channel interoffice signaling system is described in the *Bell System Technical Journal,* Vol. 57, No. 2, dated Feb. 1978, and is represented herein by CCIS blocks 123 and 126 and data link 132.

Coupled to the toll switching system is the network services complex 100 comprising a main processor system including NSC processor 101 and input/output controller 130, a data bridge system 135, an audio bridge system 128, CCIS terminal 126, DS-1 interface 129, time slot interchange 124, data store announcement system 125 and a plurality of tone receivers, such as 138. Network services complex 100 can also include other units such as additional audio conferencing bridges, speech recognition systems, data processing units, etc.

The network services complex is disclosed in the copending application of D. E. Herr, R. Metz, L. E. Suk, P. R. Wiley and D. F. Winchell Ser. No. 382,602, filed May 27, 1982, and the reader is directed to that disclosure for a more detailed description of the network services complex. In order to appreciate how the present invention is utilized in a system such as the network services complex, a brief overview of the complex and its various subsystems will be given herein, but it will be obvious to one skilled in the art that the present invention is equally applicable to other conference systems without departing from the spirit and scope of the invention.

It is intended that network services complex 100 function with many different types of switching systems to provide several special services in addition to those mentioned above. As such, complex 100 has been designed to connect to a switching system via conventional interoffice trunks 131 and a CCIS type data link 132. The interoffice trunks 131 serving complex 100 are digital facilities similar to the trunks between toll office 102 and local office 103 as described above and the data link 132 and its terminals are similar to those described in the 1978 *Bell System Technical Journal* cited above. Although these terminals are referred to as CCIS terminals, it is not essential that they be integrated in the CCIS signaling system use for call processing in the network.

The network services complex is modularly designed to allow for various service units to be added. All units are interconnected over a data bus 133 and a control bus 134. The control bus is used by the NSC processor 101 to communicate control, status and error information with the various units in the complex. Program associated data, billing data, etc., which is distinguished from customer data to be conferenced, is also transmitted over control bus 134. Data bus 133 consists of a transmit bus and a receive bus and each bus is a 256 time slot, time-multiplexed PCM data bus.

Interface 129 connects the T1 trunks from toll switching system 102 to time slot interchange unit 124 which under the direction of processor 101 switches any time slot in the receive T1 bus or the transmit portion of data bus 133 with any time slot on the T1 transmit bus or the receive portion of data bus 133. Thus, the interface 129, time slot interchange 124, and bus 133 provide the path for the exchange of voice, data, announcements and inband signaling between the toll switching system 102 and units of the network services complex.

The network services complex 100 is controlled by NSC processor 101 which performs or initiates all call processing, maintenance, fault recovery, diagnostics and audits for the entire complex. Processor 101 also interfaces with terminal 126 to transmit and receive messages from the host toll switching system 102.

As mentioned above, the network services complex can be equipped to furnish many services. For purposes of illustration, let it be assumed that the complex is equipped for dial-up audio/data conferencing with voice prompting. Accordingly, the complex comprises an audio bridge system 128 which is used for combining the digital voice samples of speakers on a conference for distribution to other participants of the conference. A typical audio conference arrangement suitable for use in the network services complex and the present invention is disclosed in more detail in the aforementioned D. E. Herr et al. patent application and a description of that arrangement need not be reiterated herein for a complete understanding of the present invention.

Data bridge system 135, on the other hand, receives data from each conferee's data terminal and distributes the data to the other conferees at the correct speed, in the proper format, etc. The term, data, when used with respect to information transmitted by a customer, is meant to include digital representations of video signals, facsimile signals from devices such as electronic chalk boards, etc., which is separate from the voice and tone signals transmitted by the customer. A typical data bridge system suitable for use in the present arrangement is disclosed in the aforementioned patent application of D. E. Herr et al. and the copending application of D. E. Herr, L. A. Russell, R. Metz, Ser. No. 415,254, Filed Sept. 7, 1982. The reader is directed to these applications for a more complete disclosure of a data bridge which need not be reiterated herein for a full understanding of the present invention.

Network services complex 100 also includes a data store system 125 for furnishing tones and announcements to instruct the customers in the use of the special services, and a tone receiver 138 which receives the tone signals representing digits generated by the customer in establishing and controlling a conference.

A typical data store system is described in more detail in a copending application of T. W Anderson, R. J. Milczarek and C. H. Peters, Ser. No. 380,511 filed May 21, 1982 and need not be disclosed herein in further detail. Tone receivers, on the other hand, are well known. The receiver contemplated for use in the present invention responds to dual-tone multifrequency signals, performs certain interdigit and digit timing functions, etc.

DS-1 interface 129 in this embodiment provides an interface for up to five T1 trunks (120 channels or time slots) which terminate on time slot interchange unit 124. The time slot interchange unit in turn, functions to switch these circuits with 256 time slots on time multiplexed data bus 133 to interconnect the channels with the various service units in network services complex. Thus, voice, data, and signaling information incoming over the toll telephone network from a conferee is forwarded via interface 129, and time slot interchange 124 to the audio and data bridges for conferencing or to the tone receiver for digit detection and collection while announcements and tones from data store system 125 and conference data from the bridges are transmitted back via the time slot interchange over the toll network to the conferees.

The control interface between the network services complex systems and the toll switching system 102 is via a main processor system including NSC processor 101, input/output controller 130, and terminal 126. It is via this path that orders are exchanged between the network services complex and the toll switching system.

Figure 2:
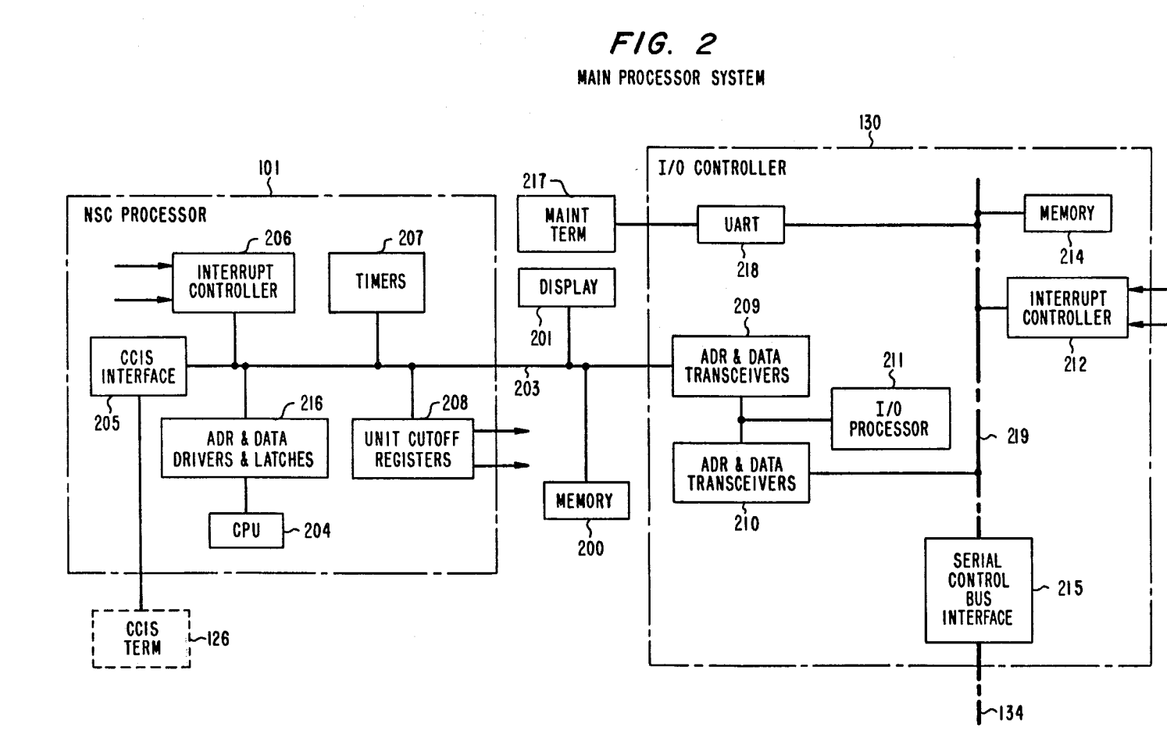
FIG. 2 shows the main processor system of the network services; complex.

The main processor system for the network services complex is shown in more detail in FIG. 2. The main processor system comprises NSC processor 101, memory 200, input/output controller 130, and display 201 which are interconnected over system bus 203. The main processor system is a distributed processor which is responsible for all call processing, maintenance, fault recovery, certain diagnostics and audits for the network services complex as a whole. The main processor system also keeps track of all system resources such as what ports are assigned to a particular conference, the status of all ports and receivers, the identification of available announcements, etc.

Communication with the toll switching system 102 is via terminal 126 which accesses processor 101 via a direct memory access channel, and processor 101 distributes orders to and receives replies from the peripheral service units (such as the data bridge, the audio bridge, etc.) via input/output controller 130 which acts as a direct memory access controller for the processor. Using a shared area of memory 200, controller 130 transfers messages between the peripheral service units and processor 101.

The units within the main processor system communicate via system bus 203 in a master-slave relationship. Central processing unit (CPU) 204, I/O processor 210, and a memory refresh controller (not shown), act as masters with the other units acting as slaves. Contention between bus masters is resolved by a bus arbiter arrangement in a well-known manner.

The NSC processor 101 comprises CPU 204, interrupt controller 206, interface 205, timer 207, and unit cutoff registers 208.

Interrupt controller 206 responds to signals from equipment such as timer 207 and controller 130. It will be noted that CCIS interface 205 resides on the system bus to permit any master on the bus to access a random access memory (RAM) which resides in the terminal 126.

As mentioned above, the serial control bus 134 interconnects the main processor system with the peripheral service units for control information and time multiplexed data bus 133 interconnects the units for data flow. These units can be disabled and forced off the bus by unit cutoff registers 208 under the direction of CPU 204.

The input/output controller 130 acts as a direct memory access controller for memory 200 and all service unit operations. In addition, it permits maintenance personnel to access the system via a maintenance terminal 217. I/O processor 211 accesses its own resident bus 219 via address and data transceivers 210, and it accesses the system bus 203 via address and data transceivers 209.

I/O processor 211 has its own memory 214 for program storage and its own interrupt controller 212. It is via interrupt controller 212 that the peripheral units such as the audio bridge, data bridge, etc., gain access to main processor system of the network services complex.

All communication of the control information between the main processor system and the other units of the complex is via serial control bus interface 215 and control bus 134. The main processor system units act as a master on the control bus with the audio bridge system, data bridge system, data store system, tone receivers, time slot interchange unit, etc. acting as slaves. Messages from the main processor system are formatted with a destination address of the peripheral system to which the message is directed, followed by an operation code which specifies the function of the message and a data field containing the contents of the message. If a peripheral unit such as the data bridge wishes to utilize the control bus 134, it signals over a dedicated interrupt lead to interrupt controller 212, and the main processor system can grant control of the bus with the next message it sends over the bus.

Sequence of Operations—Audio/Data Conference

The overall operation of the conference arrangement can best be illustrated by describing the sequence of events that take place when a customer originates a conference call.

Figure 3:
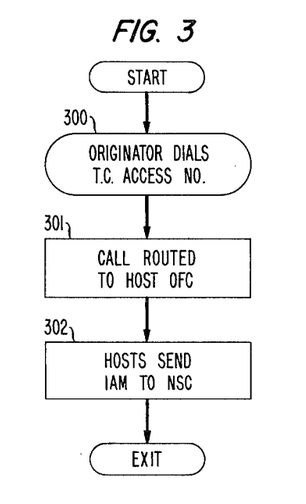
FIGS. 3-6 show the various flow diagrams which depict the overall operation of the system.

The conference originator begins by dialing into his/her local office a conference service access code of 10 or 11 digits, such as 0+700+456+X000, as shown in box 300 of FIG. 3. The first digit might be used to route the call through a switching facility which enables the automatic identification of the calling customer for billing purposes. The next three digits provide a uniform code which identifies all special services such as those to be provided by the network services complex on a nationwide basis so that all customers within a wide geographic area utilize the same code. In the example being described, the digits 700 are used. The fifth through seventh digits (such as, "456") identify all teleconferencing services and the last four digits indicate the particular conference services, such as audio-only, audio/data, the size of the conference required, etc. For purposes of illustration, let it be assumed that the customer wishes to originate an audio/data conference.

The call is routed via the telephone network in a conventional manner to a toll switching system having a network services complex, such as toll system 102 shown in FIG. 1. Switching system 102 selects an idle trunk in the T1 link 131 and sends an initial address message (IAM) over data link 132 (as shown in box 302) to the network services complex indicating that conference resources are desired.

In response to the initial address message, network services complex processor 101 ascertains if it has sufficient conference resources to provide the service. It does this by examining tables in RAM 200 which lists all of the available facilities along with their busy/idle status.

Figure 4:
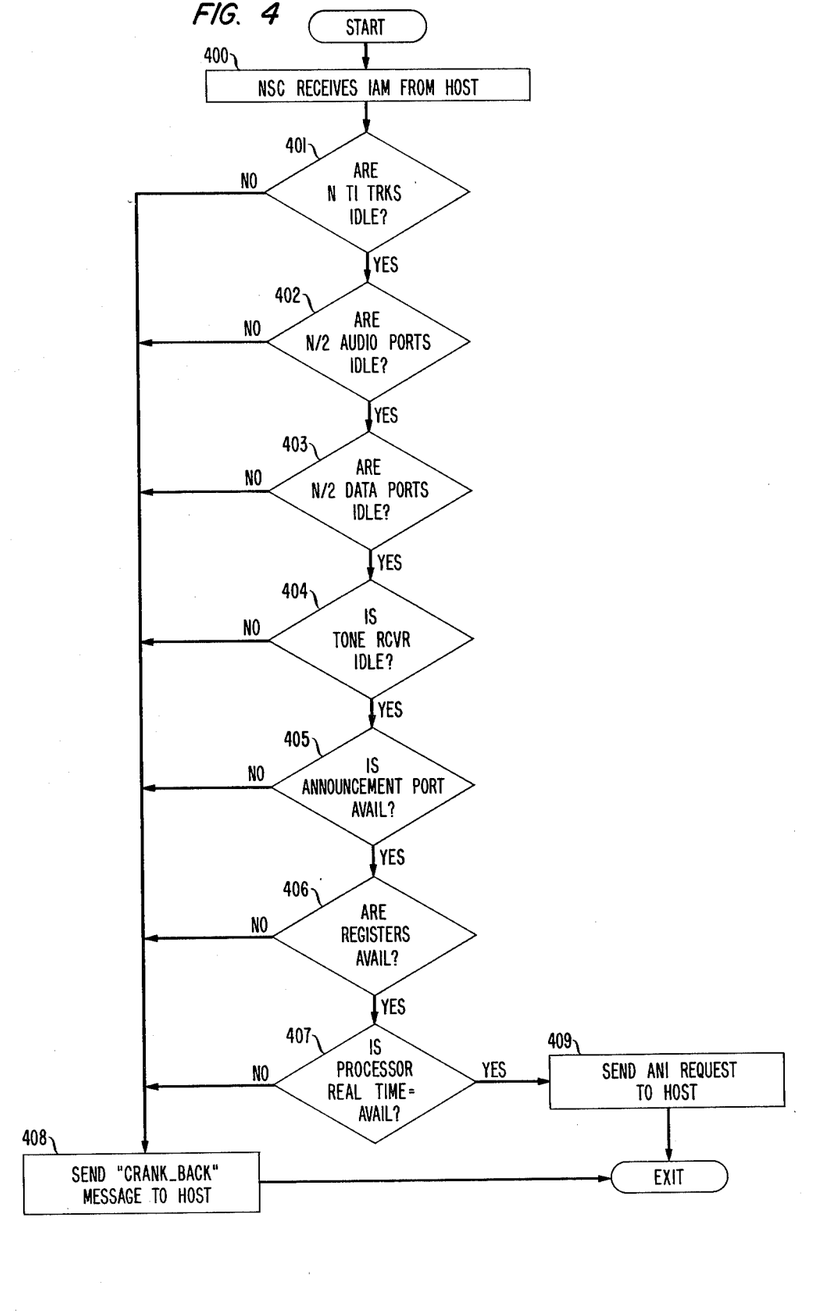

More specifically, as shown in FIG. 4, the processor ascertains if a quantity "N" of T1 trunks are available in the link 131 between the host toll switching system 102 and the time slot interchange 124.

In accordance with a feature of the invention, the network services complex main processor 101 assumes that a customer desires a conference having a predetermined size before accepting the call from the host switching system. While as many as 64 audio channels and 64 data channels can be conferenced by the audio and data bridges respectively, it has been found that most conferences are much smaller. Thus, in this embodiment the processor 101 assumes that a conference having five audio conferees and five data conferees will be established. Accordingly, processor 101 ascertains if at least ten T1 trunks are idle as shown in box 401.

As described in the aforementioned D. E. Herr et al. application, once the network services complex accepts the call, the customer can enter the desired number of conferees and select more or less ports if necessary for a particular conference.

Returning now to the description of the sequence of operations with respect to FIG. 4, processor 101 then ascertains if a sufficient number of audio and data ports are available by performing the processes described in boxes 402 and 403.

In the system being described, the conference can be controlled from a customer station through the use of a dual-tone multifrequency keyset at the station. Thus, the network services complex processor 101 ascertains if a tone receiver is available for connection to the originator as shown in box 404.

Also, as noted above, the illustrative conference arrangement utilizes voice prompts to assist the customer in the use of the system. Accordingly, the processor executes box 405 to ascertain if at least one playback buffer in the data store is available for playing announcements to the customer.

Processor 101 then examines its memory to assure that sufficient memory space is available to set up the conference. This memory space is used for call processing and billing registers. This is accomplished by processor 101 performing the operation shown in box 406.

At this point in the call, boxes 401–406 have been executed, and processor 101 has ascertained if sufficient resources are available in each of the groups of resources comprising T1 trunks, audio ports, data ports, tone receivers, announcement ports and registers. In accordance with another feature of the invention, processor 101 then ascertains if it has sufficient real time capacity to furnish the customer with a high grade of conference service.

Figure 5:
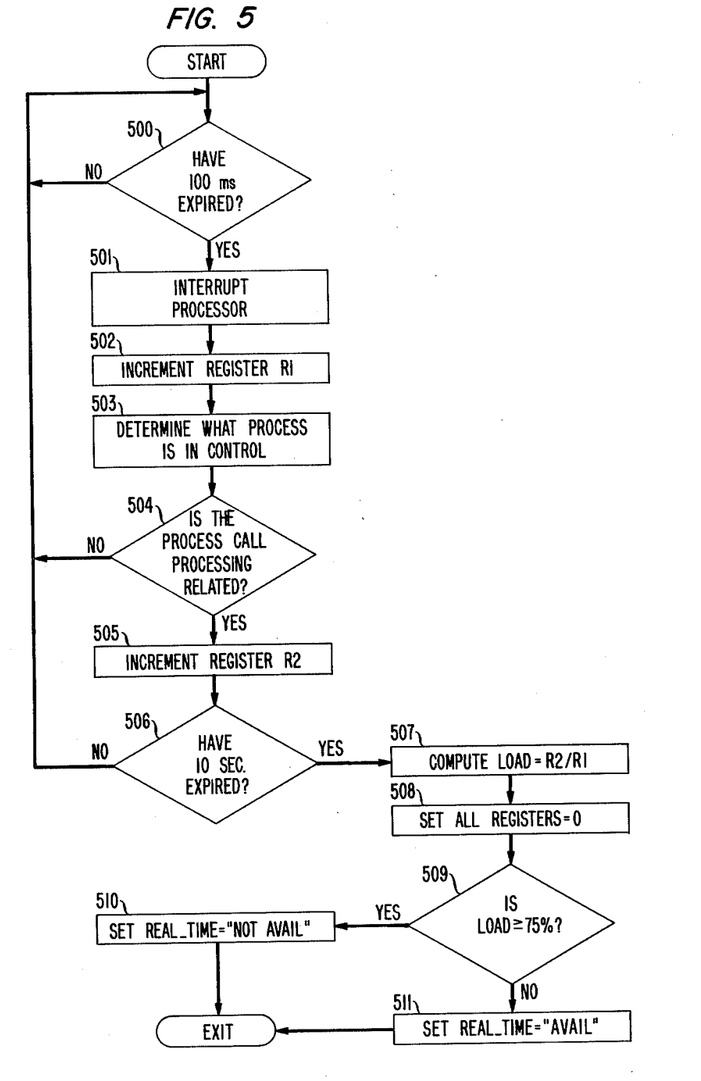

The overall sequence of operation for evaluating the real time capability of processor 101 is set forth in the flow diagram of FIG. 5.

The programming of processor 101 can be considered as divided into discrete programs which are executed under control of an operating system. For example, one program may be strictly concerned with customer interaction in that it responds to the digits dialed by the customer and then orders certain prompts to be played back to the customer in accordance with the digits dialed. Another program might deal with exchanging messages via the data link 132 to the host switching system. Still another program may be involved with a maintenance function such as running audits.

As shown in boxes 500 and 501, NSC processor 101 is interrupted every 100 miliseconds by a timed interrupt. The "number of samples" register, R1 is then incremented. The processor determines which discrete program is being executed when the interrupt occurs and determines whether that process is "call processing" related. Processes such as audits and maintenance are not directly concerned with call processing and are excluded from the "number of samples" count. If the process being executed is related to call processing, a register R2 is incremented.

As shown in box 507, a ratio (R2/R1) is then computed to ascertain the relationship between the call processing load and the total processor time. All registers are then set back to zero (box 508) in preparation for the next count.

Processor 101 must then decide whether it has sufficient real time capability to accept the conference service request or to reject the call. This is accomplished by comparing the computed ratio to a predetermined percentage. In this illustrative embodiment, it has been assumed that the processor will reject new requests if its call processing program load is equal to or greater than 75 percent. This is accomplished by processor 101 executing boxes 509–511 in FIG. 5.

Returning now to the main flow diagram of FIG. 4, and more particularly box 407 which represents the abovedescribed sequence of events, let it be assumed that sufficient resources (i.e., audio ports, data ports, etc.) and processor real time are available, and the "yes" branch of box 407 is executed.

Processor 101 then orders terminal 126 to send a message to the host switching system 102 requesting identification of the conference originator. This is an indication to the host that the conference call will be accepted by the network services complex, and the call can proceed in the manner described in the aforementioned D. E. Herr et al. application.

Figure 6:
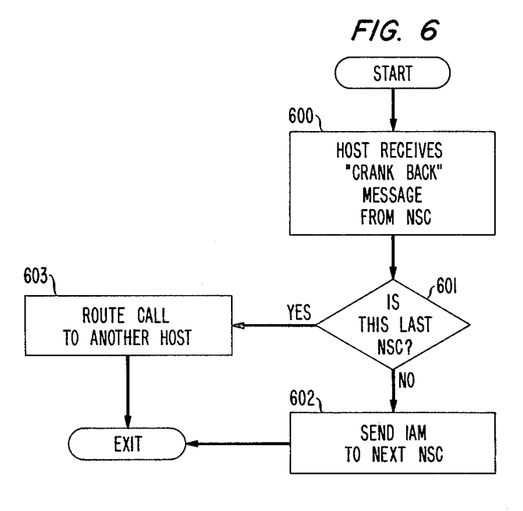

Had any of the resources been unavailable in sufficient quantities for the conference, as indicated by executing the "no" branch of one of the boxes 401–406, or had insufficient real time been available (box 407), the call would have been tagged as a "crank-back" call. A crank-back message is then sent to the host switching system from data terminal 126, and upon receipt of the crank-back message, central control 118 at the host switching system 102 goes through alternate routing procedure as shown in FIG. 6.

Since the host may serve several network services complexes, the central control 118 attempts to route the call to another network services complex connected to the host. If no other complexes are connected to this host, the toll switching system 102 selects an outgoing trunk to an alternate host switching system, and forwards the request for a conference call to that alternate host.

In summary, a system has been described wherein a conference facility, is interrogated as to its capability with respect to various resources and real time call processing capability. If sufficient resources are not available to provide adequate conferencing service for the customer, the call is withdrawn from the first selected conference facility, and an attempt is made to serve the customer via an alternate facility.

It is to be understood that the arrangements described herein are merely illustrative of the applications of the principles of the invention, and that numerous other arrangements may be devised by those skilled in the art without departing from the spirit and scope of the invention. For example, the types of resources examined for determining conference availability is not limited to data ports, audio ports, trunks, registers and tone receivers.

What is claimed is:

1. For use in a communication system having a switching system serving a plurality of customer stations and a conference arrangement coupled to said switching system, said conference arrangement comprising
    means for bridging together a plurality of customer stations for conferencing,
    means for controlling said bridging means,
    means responsive to a service request signal from said switching system for ascertaining the availability of said bridging means and said control means, and
    means actuated by said ascertaining means for indicating to said switching means the unavailability of said conference arrangement when either said bridging means or said control means is unavailable.

2. The invention set forth in claim 1
    wherein said bridging means comprises a plurality of groups of resources, and
    wherein said ascertaining means includes means for ascertaining when a predetermined number of resources are available in each said group of resources.

3. For use in a communication system having a switching system for interconnecting a plurality of customer stations, a conference arrangement coupled to said switching systems, said conference arrangement comprising
    multiport bridging means for bridging together a plurality of customer stations for conferencing,
    a plurality of receivers each operative for receiving control signals from a said customer station coupled thereto,
    a plurality of registers for storing conference call processing data,
    a program controlled processor operable to execute a plurality of programs including call processing programs and other programs for controlling said bridging means, said receivers and said registers,
    first means responsive to a service request signal from said switching system for indicating the unavailability of anyone of said bridging means, said receivers and said registers,
    second means responsive to said service request signal for indicating the unavailability of said processor to execute said call processing programs, and
    means responsive to at least one of said first and second means for signaling said switching system when one of said first and second means is unavailable.

4. For use in a communication network having a switching system, customer stations serviced by said switching system and a conference arrangement coupled to said switching system, said conference arrangement having a plurality of conference resources for use in establishing a conference call and common control means for controlling the utilization of said resources, a method for controlling the routing of calls from said stations to said conference arrangement comprising the steps of
    transmitting a request for a conference call from said switching system to said conference arrangement,
    ascertaining whether a sufficient number of the conference resources are available for the conference call,
    ascertaining whether the common control means has sufficient real time capacity to process the conference call, and
    routing the call from the switching system to the conference arrangement only when sufficient resources and common control real time are available.

5. The invention set forth in claim 4
    wherein the common control means comprises a program controlled processor operable to execute a plurality of call processing programs and other programs, and wherein the step of ascertaining whether the common control means has sufficient real time capacity comprises the steps of
    keeping a record of each program executed during a prescribed interval of time,
    calculating the ratio of call processing programs executed to the total programs executed during said prescribed interval, and
    comparing the calculated ratio to a predetermined quantity.

6. The invention defined in claim 4 or 5
    wherein said resources include a group of conference ports, a group of receivers and a group of registers,
    wherein the step of ascertaining whether sufficient resources are available includes the step of examining each said group to ascertain if a predetermined quantity are available.

7. The invention set forth in claim 4 or 5 wherein the step of routing the call includes transmitting of first signal to said switching system when sufficient resources and common control real time are available and transmitting a second signal to said switching office when insufficient resources or insufficient common control real time are available.

* * * * *